United States Patent
Rath et al.

(10) Patent No.: US 11,556,539 B2
(45) Date of Patent: Jan. 17, 2023

(54) PREDICTING AND HALTING RUNAWAY QUERIES

(71) Applicant: Oracle International Corporation, Redwood Shores, CA (US)

(72) Inventors: Pallab Rath, Bangalore (IN); Hozefa Yusuf Palitanawala, Foster City, CA (US); Vijay Simha Joshi, Karnataka (IN)

(73) Assignee: Oracle International Corporation, Redwood Shores, CA (US)

( * ) Notice: Subject to any disclaimer, the term of this patent is extended or adjusted under 35 U.S.C. 154(b) by 127 days.

(21) Appl. No.: 16/903,157

(22) Filed: Jun. 16, 2020

(65) Prior Publication Data
US 2021/0081409 A1    Mar. 18, 2021

Related U.S. Application Data

(60) Provisional application No. 62/900,792, filed on Sep. 16, 2019.

(51) Int. Cl.
| | |
|---|---|
| *G06F 16/2455* | (2019.01) |
| *G06F 16/2453* | (2019.01) |
| *G06F 11/34* | (2006.01) |
| *G06F 9/50* | (2006.01) |
| *G06F 16/22* | (2019.01) |

(52) U.S. Cl.
CPC ........ *G06F 16/2455* (2019.01); *G06F 9/5027* (2013.01); *G06F 11/3409* (2013.01); *G06F 16/2282* (2019.01); *G06F 16/24542* (2019.01); *G06F 2209/5022* (2013.01)

(58) Field of Classification Search
CPC .................. G06F 16/2455; G06F 16/2282
USPC ................................................. 707/720
See application file for complete search history.

(56) References Cited

U.S. PATENT DOCUMENTS

| | | | |
|---|---|---|---|
| 6,529,901 B1 * | 3/2003 | Chaudhuri | G06F 16/2462 |
| 2003/0065648 A1 * | 4/2003 | Driesch, Jr. | G06F 16/24561 |
| 2009/0063580 A1 * | 3/2009 | Allen | G06Q 10/06 |
| 2014/0156632 A1 * | 6/2014 | Yu | G06F 16/24554 |
| | | | 707/713 |
| 2015/0154255 A1 * | 6/2015 | Cole | G06F 16/24542 |
| | | | 707/718 |

(Continued)

*Primary Examiner* — Muluemebet Gurmu
(74) *Attorney, Agent, or Firm* — Invoke

(57) ABSTRACT

Operations include halting a runaway query in response to determining that a performance metric of the query exceeds a performance threshold. The runaway query halting system receives a query execution plan associated with a query and divides the received execution plan into one or more components. For each component, the system determines a predicted resource usage associated with executing the component. The system further determines a predicted resource usage associated with the query execution plan based on the predicted resource usage associated with each component. The system executes the query associated with the received query execution plan and compares the predicted resource usage associated with the query to a resource usage threshold. In response to determining that the predicted resource usage of the query execution plan exceeds the resource usage threshold, the system halts execution of the query associated with the query execution plan.

20 Claims, 3 Drawing Sheets

(56) References Cited

U.S. PATENT DOCUMENTS

2016/0004964 A1* 1/2016 Chu .................. G06N 3/088
                                                    706/25
2017/0329835 A1* 11/2017 Lee .................. G06F 9/5083
2018/0173758 A1* 6/2018 Barsness .......... G06F 16/24542

* cited by examiner

PREDICTING AND HALTING RUNAWAY QUERIES

INCORPORATION BY REFERENCE

This application is hereby incorporated by reference: application Ser. No. 62/900,792 filed on Sep. 16, 2019. The Applicant hereby rescinds any disclaimer of claim scope in the parent application or the prosecution history thereof and advises the USPTO that the claims in this application may be broader than any claim in the parent application.

TECHNICAL FIELD

The present disclosure relates to query monitoring and prediction. In particular, the present disclosure relates to predicting and halting execution of runaway queries.

BACKGROUND

A query fetches requested data from a database. Commonly, data is stored in a relational database. A relational database stores data in one or more tables. The tables are comprised of rows of data, organized into fields or columns. For example, "FirstName" and "LastName" are fields of a data table, and the number of rows therein is the number of names stored to the table.

Structured Query Language (SQL) is a language for managing data in relational databases. An SQL query is used to retrieve data based on specified criteria. Most SQL queries use the statement SELECT, which retrieves data. The SQL query may specify criteria such as FROM—to specify tables to be queried; JOIN—to specify the rules for joining tables; WHERE—to restrict the rows returned by the query; GROUP BY—to aggregate duplicative rows; and ORDER BY—to specify the order in which to sort the data. For example, the SQL query "SELECT breed, age, name FROM Dogs WHERE age<3 ORDER BY breed" will return a list of dogs under 3 years old from the table "Dogs," in alphabetical order by breed, retrieving the breed, age, and name of each dog. The output may include: "Bulldog 1 Max|Cocker Spaniel 2 Joey|Golden Retriever 1.5 Belinda."

Increasingly, databases are stored using a multitenant cloud architecture. In a multitenant cloud architecture, data from different tenants is stored using shared resources. Shared resources may be some combination of a server, a database, and/or a table, in whole or in part. Multitenancy reduces the amount of resources required to store data, saving costs. However, when multiple tenants are using a resource at the same time, it may result in slower runtimes.

A query runtime (also referred to herein as "runtime") is the time taken to execute a query. The query runtime may vary with numerous factors. Attributes of a query itself affect the query runtime. For example, the query runtime may depend on the number of rows and/or tables being queried, and what operations are to be executed on the tables. Properties of a shared cloud infrastructure also affect query runtime. For example, the query runtime may depend on the number of queries currently being run by other tenants of the shared cloud infrastructure. When a user is creating a complicated SQL query on a multitenant platform, a query may take a relatively long time to execute in comparison to other queries. Due to the many factors affecting query runtime, a user does not know whether a query to-be-executed will take seconds, minutes, or hours. A runaway query is a query whose execution time is taking longer than an expected execution time. Runaway queries can use more processor cycles or other resources than intended during execution.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. RUNAWAY QUERY HALTING SYSTEM
3. HALTING A RUAWAY QUERY
4. EXAMPLE QUERY CATEGORIZATION
   4.1 ADDING A QUERY TO HISTORICAL DATA
   4.2 RUNAWAY QUERY CLASSIFICATION
5. MISCELLANEOUS; EXTENSIONS
6. HARDWARE OVERVIEW

1. General Overview

One or more embodiments relate to a runaway query halting system. The runaway query halting system may determine information about a query to-be-executed, such as estimated performance characteristics. As an example, the runaway query halting system may determine an estimated query runtime for a query prior to execution of the query.

In an embodiment, the runaway query halting system may monitor attributes of the query during execution of the query. As an example, the runaway query halting system may monitor a current running time of the query during execution. The runaway query halting system may further determine a threshold execution duration of the query. In response to determining that the current execution time of the query exceeds the threshold execution duration, the query halting system may halt execution of the query.

In an embodiment, the runaway query halting system may halt a query based on over-use of resources. For example, the runaway query halting system may predict an amount of resources required for completion of a received query. If the predicted amount of resources exceeds a resource usage threshold, the runaway query halting system may halt execution of the query.

In embodiments, the runaway query halting system may halt a query during execution. For example, the runaways query halting system may monitor a query that is being executed to determine current performance metric. The current performance metric may include one or more of a current execution time, an estimated remaining execution time, a current resource utilization, and an estimated resource utilization during remaining execution. In some embodiments, the system may halt a query if the current performance metric exceeds a performance value threshold, the runaway query halting system may halt execution of the query.

One or more embodiments described in this Specification and/or recited in the claims may not be included in this General Overview section.

2. Runaway Query Halting System

Figure 1:
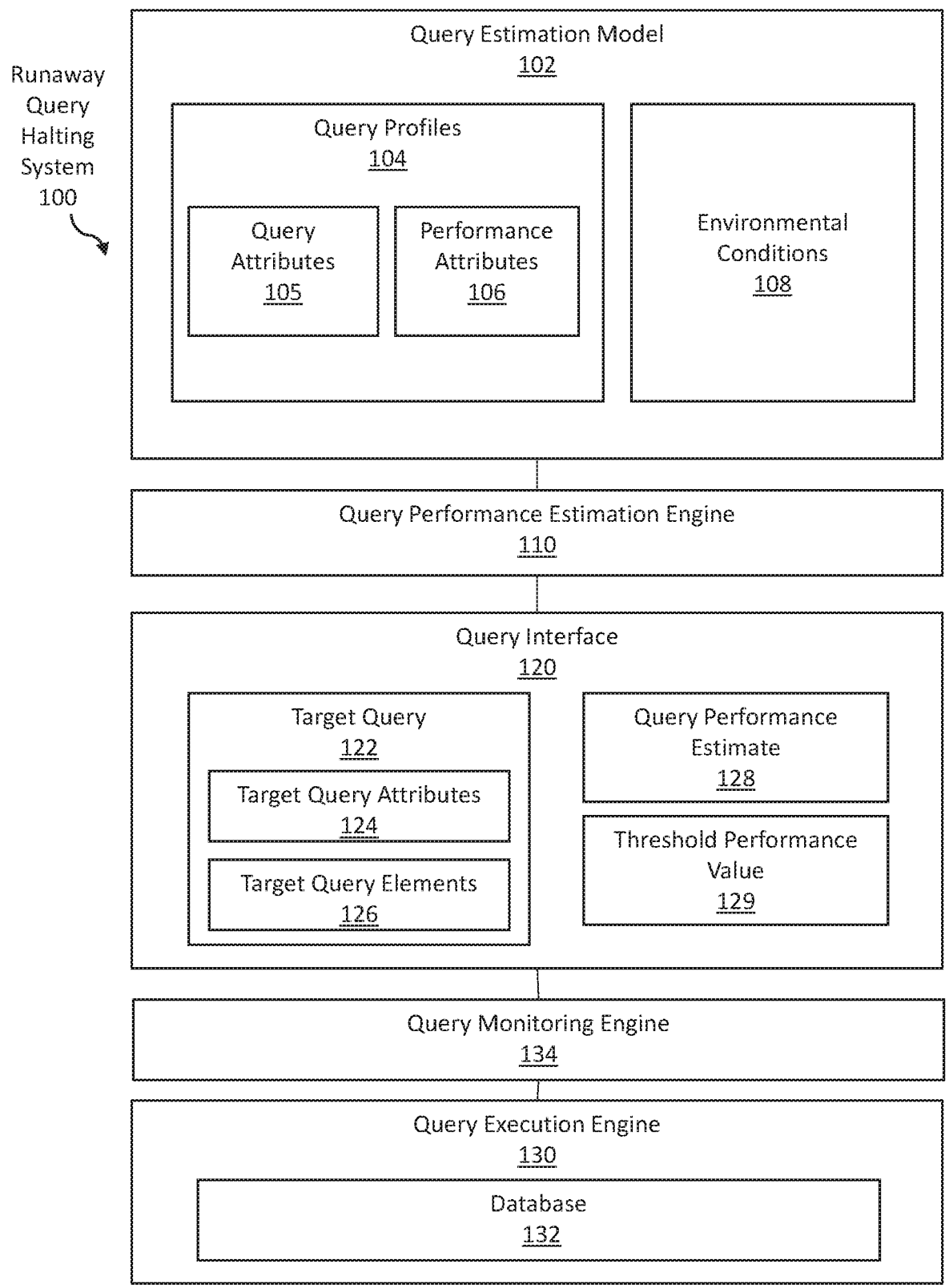
FIG. 1 illustrates a system for halting a runaway query in accordance with one or more embodiments.

FIG. 1 illustrates a runaway query halting system 100 in accordance with one or more embodiments. The runaway query halting system 100 is a system which is designed to predict query resource usage, including, for example disk input/output (I/O) usage, central processing unit utilization, and/or execution time. The runaway query halting system 100 is further designed to monitor executing queries, and to halt queries which are overusing the resources.

As illustrated in FIG. 1, the runaway query halting system 100 includes a query estimation model 102, a query performance estimation engine 110, a query interface 120, and a query execution engine 130. In one or more embodiments, the runaway query halting system 100 may include more components or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In an embodiment, the query estimation model 102 is a model for estimating query performance. As examples, the query estimation model may be used to estimate one or more of query runtime or query resource usage. The runaway query halting system 100 may use a machine learning algorithm to generate a query estimation model 102.

The query estimation model 102 may correspond to a mathematical function which (a) accepts as input query attributes and/or environmental attributes, and (b) generates as output estimated query performance. The query estimation model may be a multi-variable regression model, such as a linear regression model. For example, the runaway query halting system 100 may use a linear regression model to help in predicting resources used for a particular query. The predicted resource usage may be used as a basis for determining that a particular query is a runaway query. Additionally or alternatively, various classification algorithms such as neural networks, support vector machine, decision trees and/or Naïve Bayes Classifiers may be used to help predict if the particular query is runaway query. The runaway query halting system 100 may fit a query estimation model 102 using query profiles 104 of previously executed queries. Specifically, the query optimization model 102 may be used to estimate performance of a query based on (a) how other already-executed queries with similar attributes have performed and (b) current environmental conditions.

In an embodiment, query profiles 104 include data corresponding to previously executed queries. Query profiles 104 may include both the query attributes 105 and performance attributes 106 of previously executed queries.

Query attributes 105 include any attributes of a query which may affect query performance. A query attribute 105 may be a user-specified query definition element, such as a field that was requested in a previously executed query. A query attribute may be an attribute which depends upon user-specified parameters of a query and/or environmental conditions when the particular query was executed. Query attributes 105 may include the number of data fields requested in an SQL query, the number of rows in tables containing requested data fields, and the number of filtering (WHERE) conditions in an SQL query. Query attributes 105 may incorporate environmental conditions when a particular executed query was being executed.

Query attributes 105 may be represented as vectors. For example, the query optimization system saves the parameters "number of data fields requested by SQL query" and "number of rows in tables containing the requested data fields," for 10 executed queries $Q_i$, as an input vectors $v_i$ (where i=1, . . . , 10 is an index for each of the 10 queries). For each query the vector $v_i$ stores the values: (number of data fields, number of rows).

In an embodiment, performance attributes 106 are attributes describing the performance of previously executed queries. The performance of a query may include, for example, a runtime of the query. A query runtime may be calculated as the time period between transmitting a request to execute a query and receiving results from the execution of the query. For example, the system stores a vector y of runtimes for a set of previously executed queries. As an example, the performance of the query may indicate that execution of the query took 5 seconds on average. The performance of a query may indicate that execution of the query did not complete half the time.

In an embodiment, the performance attributes 106 may indicate a number, type, or severity of errors that were generated when a particular query was executed. As an example, multiple executions of a particular query may be analyzed to identify a percentage of executions with errors. The percentage of executions with errors may be stored as a performance attribute mapped to query attributes associated with the particular query.

In an embodiment, the performance attributes 106 may indicate a level of utilization of resources (such as a Central Processing Unit (CPU)) for execution of a query. As an example, multiple executions of a particular query may be analyzed to identify an average utilization of the CPU corresponding to execution of the particular query. The average utilization of the CPU may be stored as a performance attribute mapped to query attributes associated with the particular query.

In an embodiment, environmental conditions 108 include factors in a query execution environment which may affect the performance of a query. Environmental conditions 108 reflect conditions when a query is to be executed. Environmental conditions 108 may correspond to current environmental conditions if the query is to be executed immediately. If the execution of a query is to be scheduled at a future time, then the environmental conditions 108 may correspond to future expected conditions at the same future time scheduled for execution of the query. For a query executed on a shared cloud infrastructure, environmental conditions 108 may be the number of other queries concurrently running by other tenants of the shared cloud infrastructure. Another example environmental conditions 108 includes the amount of bandwidth (measured in CPU memory, hard disk memory, etc.) available when a query is to be executed.

Query profiles 104 map a query attribute or a combination of query attributes 105 to specific performance attribute(s) 106. In one example, a query profile indicates that queries executed on a table with 100 rows, searching for two fields (query attributes) takes x seconds (query performance). Alternatively or additionally, query profiles 104 map the effect of a particular query attribute 105 or combination of query attributes 105 on a performance attribute 106. As an example, a query profile indicates that any query requiring access to table FAR adds y seconds to the total runtime. Analysis of query profiles 104 may be used to determine how various query attributes affect query performance. Analysis of query profiles 104 may include determining how general query attributes (e.g., query on a table with n rows) or specific query attributes (e.g., query on table XYZ) affect query performance.

In an embodiment, the query estimation model 102 may be trained using supervised learning, semi-supervised learning, unsupervised learning, reinforcement learning, and/or another training method or combination thereof. In supervised learning, labeled training data includes input/output pairs in which each input is labeled with a desired output (e.g., a label, classification, and/or categorization), also referred to as a supervisory signal. In semi-supervised learning, some inputs are associated with supervisory signals and other inputs are not associated with supervisory signals. In unsupervised learning, the training data does not include supervisory signals. Reinforcement learning uses a feedback system in which a machine learning engine associated with the query estimation model 102 receives positive and/or negative reinforcement in the process of attempting to solve a particular problem (e.g., to optimize performance in a particular scenario, according to one or more predefined performance criteria). In an embodiment, the machine learning engine initially uses supervised learning to train the query estimation model and then uses unsupervised learning to update the query estimation model on an ongoing basis.

In an embodiment, the query interface 120 is a user interface (UI), such as a graphical user interface (GUI). The query interface may present components for defining a target query. As an example, the query interface may include text boxes, radio buttons, and drop-down menus. The query interface 120 may accept user-specified and/or user-selected elements for defining the target query 122.

The query interface may include a query optimizer which generated a query execution plan based on the target query 122. The optimizer attempts to determine an efficient way to execute the target query 122. The optimizer attempts to find a way to execute the target query 122 in a minimal amount of time. In doing so, the query optimizer may compare multiple permutations of actions to generate the query execution plan in a reasonable time.

The elements which define the target query 122, are referred to herein as target query elements 126. Target query elements 126 may include, for example, data fields in a table selected by a user for retrieval. Examples of target query elements include campaign description, category, and customer name, assets, costs, and earnings. A target query element 126 may include an operation to be completed in a query, such as SELECT or JOIN.

In an embodiment, target query attributes 124 are attributes or characteristics of a target query that the system uses in estimating a runtime for a corresponding target query 122. Queries with similar attributes are expected to have similar performance values. The target query attributes 124 are determined based on the elements of the target query (e.g., target query elements 126). Examples of target query attributes include, for example, the number of data fields requested by a query and the number of WHERE conditions in a query.

In an embodiment, a query interface computes a predicted performance of a target query. The predicted performance of a query may be computed with respect to performance attributes 106, described above. Predicted performance values, corresponding to a target query, may include an estimated runtime, a resource utilization estimate, a likelihood of error, an error rate estimate, an error type estimate, and a likelihood of timeout (most performance attributes not illustrated in the figures).

As described above, a query runtime may be calculated as the time period between transmitting a request to execute a query and receiving results from the execution of the query. An estimated query performance 128 of a target query is an estimate of the query performance value of the query execution plan associated with the target query, prior to actual execution of the target query, i.e., when the actual query performance is not known. In one example, which should not be construed as limiting the scope of the claims, the estimated query performance value 128 may measure runtime, and may be computed using the following formula:

$$\text{runtime} = K_1 * (\text{number of data fields requested}) + K_2 * (\text{number of rows in tables containing requested data fields}) + K_3 * (\text{number of JOIN operations required to execute SQL query})$$

where $K_1$, $K_2$, and $K_3$ are constants.

In an embodiment, the threshold performance value 129 (also referred to herein as an acceptable threshold value) is a configurable threshold for identifying runaway queries. Queries with estimated performance that exceeds the threshold performance value 129 may be identified as runaway queries which should be halted. The system may establish multiple threshold performance values 129 associated with different types of queries, or the system may use one threshold runtime value for all types of queries. Additionally, the system may establish multiple threshold performance values based on different metrics of performance. For example, the system may establish a threshold runtime value and a threshold resource utilization value. The query interface may allow a user to set an acceptable threshold performance value 129. Alternatively or additionally, the runtime query halting system may set a threshold performance value 129 based on the likelihood of a timeout. The query optimization system may set a threshold performance value 129 based on typical query times for similar queries. Examples of threshold performance values include threshold runtime values of 20 seconds, 5 minutes, 20 minutes, 1 hour, and 5 hours, and threshold resource utilization values of 5%, 10% 40%, 80%, and 100%.

In one or more embodiments, the query performance estimation engine 110 includes hardware and/or software components for estimating query performance. The query performance estimation engine 110 may include functionality to parse received target query elements 126. The query performance estimation engine 110 may include functionality to determine target query attributes 124 based on the target query elements 126. The query performance estimation engine 110 may include functionality to filter target query elements 126 to determine which target query elements are pertinent to query runtime estimation. The query performance estimation engine 110 may include functionality to fit target query attributes to a query estimation model, to determine an estimated runtime for a target query. The query performance estimation engine may include functionality to generate and/or update a query estimation model 102, using previously executed query attributes.

In an embodiment, the query execution engine 130 includes hardware and/or software configured to execute a query. The query execution engine 130 may, for example, receive a query execution plan based on an SQL query for execution. The query execution engine may transmit the query execution plan to appropriate database(s). The query execution engine may perform computations to execute a query execution plan. For example, the query execution engine may sum data, average data, and combine tables in whole or in part. The query execution engine may retrieve query results from one or more databases.

In an embodiment, the database 132 is a database storing data to be retrieved by a query. The database 132 may be a relational database comprising tables. The database 132 may be implemented on a multi-tenant platform, such that resources are shared among multiple tenants.

In an embodiment, the runaway query halting system 100 may include a query monitoring engine 134. The query monitoring engine 134 may monitor the query execution plan associated with the target query 122 during execution by the query execution engine 130. As an example, the query monitoring engine may monitor performance values associated with the query, including one or more of runtime of the query, resource utilization of the query, error indicators from the query execution engine, and timeout indicators. In some embodiments the query monitoring component may compare the performance values from the query execution engine 130 with the threshold performance value 129. In some embodiments, the query monitoring engine 134 may issue a command to the query execution engine 130 to halt execution of the query execution plan.

3. Halting a Runaway Query

Figure 2:
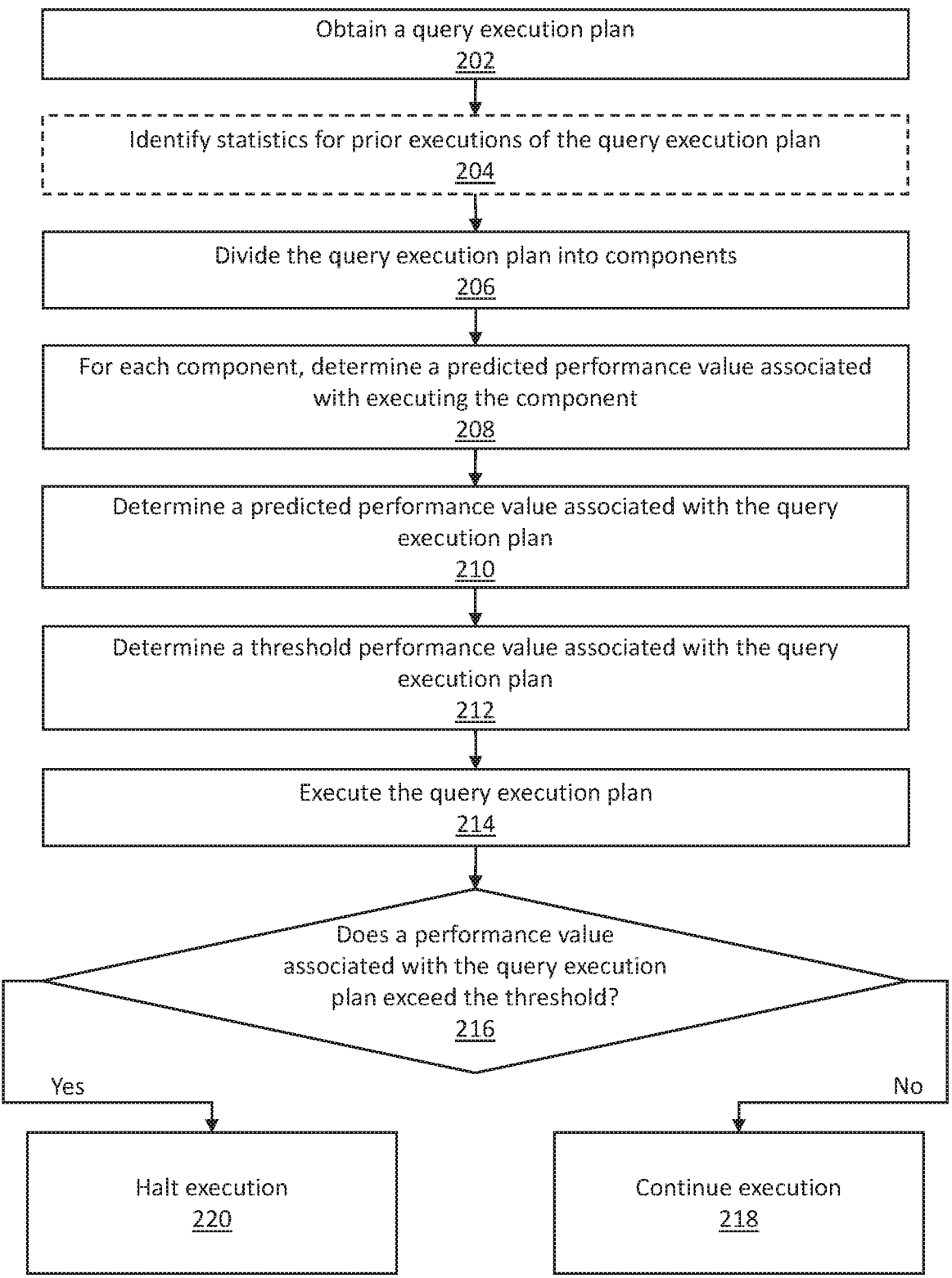
FIG. 2 illustrates an example set of operations for halting a runaway query in accordance with one or more embodiments.

FIG. 2 illustrates an example set of operations for halting a query in response to determining query execution exceeds threshold query performance estimates, in accordance with one or more embodiments. One or more operations illustrated in FIG. 2 may be modified, rearranged, or omitted altogether. Accordingly, the particular sequence of operations illustrated in FIG. 2 should not be construed as limiting the scope of one or more embodiments.

In an embodiment, a system (e.g., the runaway query halting system 100 illustrated in FIG. 1) obtains a query execution plan (Operation 202). The query execution plan may include an ordered set of steps for use in accessing data stored in a database. In particular, the query execution plan may include ordered steps for accessing data in a SQL relational database management system. For example, the system may receive a target query as an input, and may generate a query execution plan associated with the received target query.

In some embodiments, the system may compare the obtained query execution plan to prior executed query execution plans. In some embodiments, prior executed query execution plans may be stored as a vector $v_i$. The first element of $v_i$ is the runtime (measured in seconds) of a query. Elements 2-8 of $v_i$ are the following query attributes:

1) the number of query definition elements in a structured query language (SQL) query
2) the number of rows in tables containing the requested query definition elements
3) the number of filtering (WHERE) conditions in the SQL query
4) the number of JOIN operations required to execute the SQL query
5) the number of other SQL queries running by other tenants of a shared cloud infrastructure at the time the query was executed
6) the amount of bandwidth available on the shared cloud infrastructure at the time the query was executed
7) the time the query was executed In response to determining that the obtained query execution plan matches one or more previously executed query execution plans, the system may identify and/or determine statistical information associated with the prior executions of the query execution plan (Operation 204). For example, the statistical information may include one or more of, execution times for each prior execution of the query execution plan, an average runtime of all prior executions of the query execution plan, a standard deviation of the runtime for all prior executions of the query execution plan. One or more items of statistical information may be stored at the system and retrieved in response to a request for the statistical information, while some items of statistical information may be calculated or otherwise determined in response to the request for statistical information.

In an embodiment, the system may divide the obtained query execution plan into one or more components (Operation 206). The query may be divided into one or more components to facilitate predicting the amount of system resources required to complete execution of the query. The system resources can include, for example, disk Input/Output bandwidth, CPU cycles, network bandwidth, and/or memory. In some embodiments, the one or more components may be discrete operations or discrete blocks of operations to be performed by the system. For example, a query execution plan may be divided based on one or more of: operation cardinality (e.g., a number of rows being output from each operation or block of operations), an access method for fetching data (e.g., table scan or index access), a join method used in an operation or block of operations (e.g., hash, sort-merge, etc.), a join order used in an operation or block of operations (e.g., an order in which tables are joined with one another during the operation or block of operations), parallelism of execution (e.g., whether operations in an operation or block of operations in the execution plan are performed in serial or in parallel), and/or on the basis of partition pruning.

In an embodiment, the system may determine a predicted performance value associated with executing each of the one or more components (Operation 208). Predicted performance values may include one or more of an estimated runtime, a resource utilization estimate, a likelihood of error, an error rate estimate, an error type estimate, and a likelihood of timeout. In some embodiments, the predicted performance values of a component may be based on attributes associated with the particular component, including one or more of:

a number of query definition elements in a structured query language (SQL) query component a number of rows in tables containing the requested definition elements for the component the number of filtering (WHERE) conditions in the SQL query component the number and/or type(s) of JOIN operations required to execute the SQL query component the number of other SQL queries running by other tenants of a shared cloud infrastructure at the time the query component is to be executed the amount of bandwidth available on the shared cloud infrastructure at the time the query component is to be executed the time the query component is to be executed In some embodiments, the predicted performance value of a particular component can be determined based on performance values for a component having similar attributes to those of the particular component.

In some embodiments, the predicted performance value is determined based at least in part on historical data (e.g., automated workload repository data). The historical data gathered for prior queries may include, for example, wait events used to identify performance problems; time model statistics indicating the amount of database time associated with a process; active session history statistics; system and session statistics; object usage statistics; and/or resource intensive SQL statements. In some embodiments the historical data may comprise data corresponding to previous executions of the component. In other embodiments, the historical data may comprise data corresponding to previous executions of components determined to be similar to the component. That is, even where contents are not identical, it may be possible to determine a predicted performance value based on performance of similar components. For example, it may be possible to predict a performance value of Table scan of a particular Table based on a performance value of a Table scan of a different, but similarly sized, Table.

In some aspects, the predicted performance value can be determined based on a weighted average of the attributes associated with the particular component. For example, the system my determine that the number of rows in the tables being operated on and the number and/or type(s) of JOIN operations required to execute the SQL query component are more important than the number of filtering (e.g., WHERE) conditions in the SQL query component.

In an embodiment, the system may determine a predicted performance value associated with execution of the entire query execution plan (Operation 210). In some embodiments, determining the predicted performance value associated with execution of the entire query execution plan may include aggregating (e.g., adding) the predicted performance values associated with each component of the query execution plan. For example, a predicted runtime of the query execution plan may be determined as the sum of the predicted runtimes of each component of the query execution plan. Similarly, the predicted resource usage of a query execution plan may be determined as the sum of the predicted resource usages of each component of the query execution plan.

In an embodiment, the system may determine a threshold performance value of the query execution plan (Operation 212). The threshold performance values may include one or more of a runtime duration threshold, a resource utilization threshold, an error threshold, and a timeout threshold. The threshold performance value can be determined based on a number of factors.

In some embodiments, the threshold performance value can be determined based on one or more environmental factors. For example, a resource utilization threshold can be determined based on currently-available system resources. As a particular example, if a system includes a CPU that is 30% utilized (i.e., 70% unutilized) at a time when the query execution plan is to be executed, then a resource CPU utilization threshold for the query execution plan cannot exceed 70%. As another example, if a system includes a disk input/output (I/O) management system that is 40% utilized (i.e., 60% unutilized) at a time when the query execution plan is to be executed, then a resource I/O utilization threshold for the query execution plan cannot exceed 60%.

In some embodiments, the threshold performance value can be determined based on prior executions of the query execution plan. For example, when determining a runtime duration threshold for a query execution plan, the system may identify runtimes associated with at least a subset of all prior executions of the query execution plan. The runtime duration threshold may be determined as, for example, the $90^{th}$ percentile of the runtime values of the prior executions of the query execution plan. As another example, the runtime duration threshold can be determined as one standard deviation greater than an average of the prior executions of the query execution plan, or two standard deviations greater than an average of the prior executions of the query execution plan. As a third example, the runtime duration threshold can be determined as a multiple of the average of the prior executions of the query execution plan. As particular examples, the runtime duration threshold could be 150% of the average, 175% of the average, or 200% of the average.

In some embodiments, the threshold performance value can be determined based on the predicted performance value. For example, when determining a runtime duration threshold value, the threshold can be determined as a multiple of the predicted or expected runtime. For example, the runtime duration threshold could be 150% of the predicted or expected runtime, 175% of the predicted or expected runtime, or 200% of the predicted or expected runtime.

In some embodiments, the threshold performance value can be determined based on user input. For example, an administrator may put a cap on resource usage for any query. Accordingly, if resource usage far any query is capped at, 20%, then a resource utilization threshold cannot exceed 20%.

In an embodiment the system can execute the query associated with the execution plan (Operation 214). That is, the system can submit the query associated with the query execution plan to the system for execution on the database. The system can execute the query.

In embodiments, the system can monitor the execution of the query. Monitoring execution of the query may include at least comparing a performance value of the system executing the query to the threshold performance value (Operation 216).

In some embodiments, the monitoring may include comparing the predicted performance value of the query to the threshold performance value prior to execution of the query. If the predicted performance value is below the threshold performance value, the system may continue to execution of the query (operation 218). If the predicted performance value exceeds the threshold performance value, the system may halt execution of the query (Operation 220) without ever beginning execution.

In some embodiments, the monitoring may include regularly (e.g., periodically or intermittently) comparing a current performance value of the query during execution to the threshold performance value. If the current performance value is below the threshold performance value, the system may continue to execute of the query (operation 218). If the current performance value exceeds the threshold performance value, the system may halt execution of the query (Operation 220).

In an embodiment, the system may halt execution of the query execution plan (Operation 220) in response to a determination that the predicted performance value or the current performance value exceeds the threshold performance value. In some embodiments, halting execution of the query execution plan may include issuing a KILL command to halt operation of the query.

In some embodiments, halting execution of the query execution plan may include issuing one or more commands to rollback or otherwise undo changes made to the database prior to halting execution of the query execution plan.

In some embodiments, prior to halting execution of the query execution plan, the system may predict or otherwise determine a performance value (e.g., resource usage and/or runtime) associated with the rollback of the partially executed query execution plan. The system may additionally predict a performance value associated with completing execution of the query execution plan. If the performance value associated with completing execution of the query execution plan is greater than the performance value associated with rollback of the partially executed query execution plan, the system may halt execution of the query execution plan.

On the other hand, if the performance value associated with completing execution of the query execution plan is greater than the performance value associated with rollback of the partially executed query execution plan, the system may determine that the query execution plan should not be halted. In some embodiments, the system may communicate a message to the user indicating that the system is continuing execution of the query execution plan. The message may include a difference in the respective performance values. The message may further allow a user to override the decision and halt the execution of the query execution plan.

4. Example Query Categorization

In an example system, a database can include at least a sales table and a products table. The sales table may include a relatively large number of rows, while the products table may include a relatively small number of rows. For example, the sales table may include 489,000 rows, while the products table includes 767 rows.

| SQL ID | Cardinality | Access Method | Partition Range | Parallel Execution |
|---|---|---|---|---|
| 8tvurftg8zryb | 2067771 | 3 | 10 | 2 |
| 9tvurftg8zryb | 1567771 | 2 | 4 | 0 |

The system may also maintain a historical system resource usage table of historical data regarding system resources used in executing each query. The historical data can be stored based on the SQL ID of the executed query, and can include data regarding usage of resources such as CPU cycles, memory usage, network usage, and/or I/O cycle usage. An example of the historical system resource usage table is:

| SQL ID | CPU | Memory | I/O | Network |
|---|---|---|---|---|
| 8tvurftg8zryb | 6500 | 2500000 | 10 | 100000 |
| 9tvurftg8zryb | 5200 | 2400000 | 4 | 0 |

4.1 Adding a Query to Historical Data

Historical data of the queries run in the past can include the query execution plan and system resources it took to complete at that point. For example, the following query can be run:

```
SELECT
FROM
WHERE
GROUP BY prod_category;
prod_category, AVG(amount_sold)
sales s, products p
p.prod_id = s.prod_id
```

This query produces an execution plan of:

| ID | Operation | Name | Rows | Bytes | Cost (% CPU) | Time | Pstart | Pstop |
|---|---|---|---|---|---|---|---|---|
| 0 | SELECT STATEMENT | | | | 1140 (100) | | | |
| 1 | HASH GROUP BY | | 4 | 80 | 1140 (45) | 00:00:14 | | |
| 2 | HASH JOIN | | 489K | 9555K | 792 (21) | 00:00:10 | | |
| 3 | TABLE ACCESS FULL | PRODUCTS | 767 | 8437 | 10 (0) | 00:00:01 | | |
| 4 | PARTITION RANGE ALL | | 489K | 4300K | 741 (17) | 00:00:09 | 1 | 16 |
| 5 | TABLE ACCESS FULL | SALES | 489K | 4300K | 741 (17) | 00:00:09 | 1 | 16 |

The system may also include a historic query attribute table retaining historical data regarding query execution. The table may include entries for executed queries, including information regarding system resources used by the query and statistics regarding the query execution plan. For example, the system may maintain a historical query attribute table of historical data regarding attributes of the executed queries. The historical data can be stored based on the SQL ID of the query, and can include attributes such as cardinality, access method, partition range, and/or parallel execution. An example of historic query attribute table is:

Attributes associated with the query execution plan can be determined. Cardinality (e.g., a number of rows operated on) of the execution plan is determined at 1467771. An access method for the execution plan can be determined by using a value of 1 to indicate an index-based scan and a value of 2 to indicate a full table scan; the execution plan includes two full table scans, leading to an access method value of 4. A partition range (e.g., a number of partitions acted on) of the execution plan is 16. A parallel execution value can be a value indicating whether or not parallel execution is configured for the execution plan; the current execution plan has a parallel execution value of 0, indicating that parallel execution is not configured. In embodiments, the determined attributes of the query execution plan can be added to the historical query attribute table. An example historical query attribute table can be updated to include this record as shown.

| SQL ID | Cardinality | Access Method | Partition Range | Parallel Execution |
|---|---|---|---|---|
| 7tvurftg8zryb | 1467771 | 4 | 16 | 0 |
| 8tvurftg8zryb | 2067771 | 3 | 10 | 2 |
| 9tvurftg8zryb | 1567771 | 2 | 4 | 0 |

Additionally, the system resources used for executing a query execution plan can be calculated or otherwise determined. For example, given the above execution plan, system resources can be calculated, including CPU usage (4564 cycles), I/O usage (18163517 bytes), memory usage (2 MB), and network utilization (0). In embodiments, the determined system resource usage data can be added to historical system resource usage table. An example historical system resource usage table can be updated to include this record as shown.

| SQL ID | CPU | Memory | I/O | Network |
|---|---|---|---|---|
| 7tvurftg8zryb | 4564 | 2000000 | 16 | 0 |
| 8tvurftg8zryb | 6500 | 2500000 | 10 | 100000 |
| 9tvurftg8zryb | 5200 | 2400000 | 4 | 0 |

Finally, the system may store a historical runaway status table indicating whether or not a query is deemed a runaway query. The runaway status table may be stored based on SQL ID. An example runaway status table may be:

| SQL ID | Runaway? |
|---|---|
| 7tvurftg8zryb | false |
| 8tvurftg8zryb | false |
| 9tvurftg8zryb | true |

4.2 Runaway Query Classification

The system may predict whether a received SQL query will be runaway or not. A query (or portion thereof) can be received. The system can determine the resources expected to be used for execution of the query.

The system can classify the received SQL query to determine whether it is considered to be a runaway query. In embodiments, the system can use machine learning classification techniques to classify the received query, for example, the system can classify the query using techniques such as logistic regression, neural networks and/or support vector machine (SVM) classification.

The classification of the received query can be based, at least in part, on one or more attributes of the received query. In embodiments, the classification of the received query can be based, at least in part, on a system load at a time the query is to be executed. Accordingly, the system can monitor system load at a point of time by referring to one or more system resource usage metrics. In embodiments, the system takes attributes of the received query (e.g., one or more of cardinality, access method, join order, partitions, and/or parallel execution) into consideration along with the current system load and capacity in classifying the received query. The classification of the received query may also be based, at least in part, on the estimated system resources required to execute the received query. Based on the classification, the system can determine if the received query is a runaway query.

5. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 3:
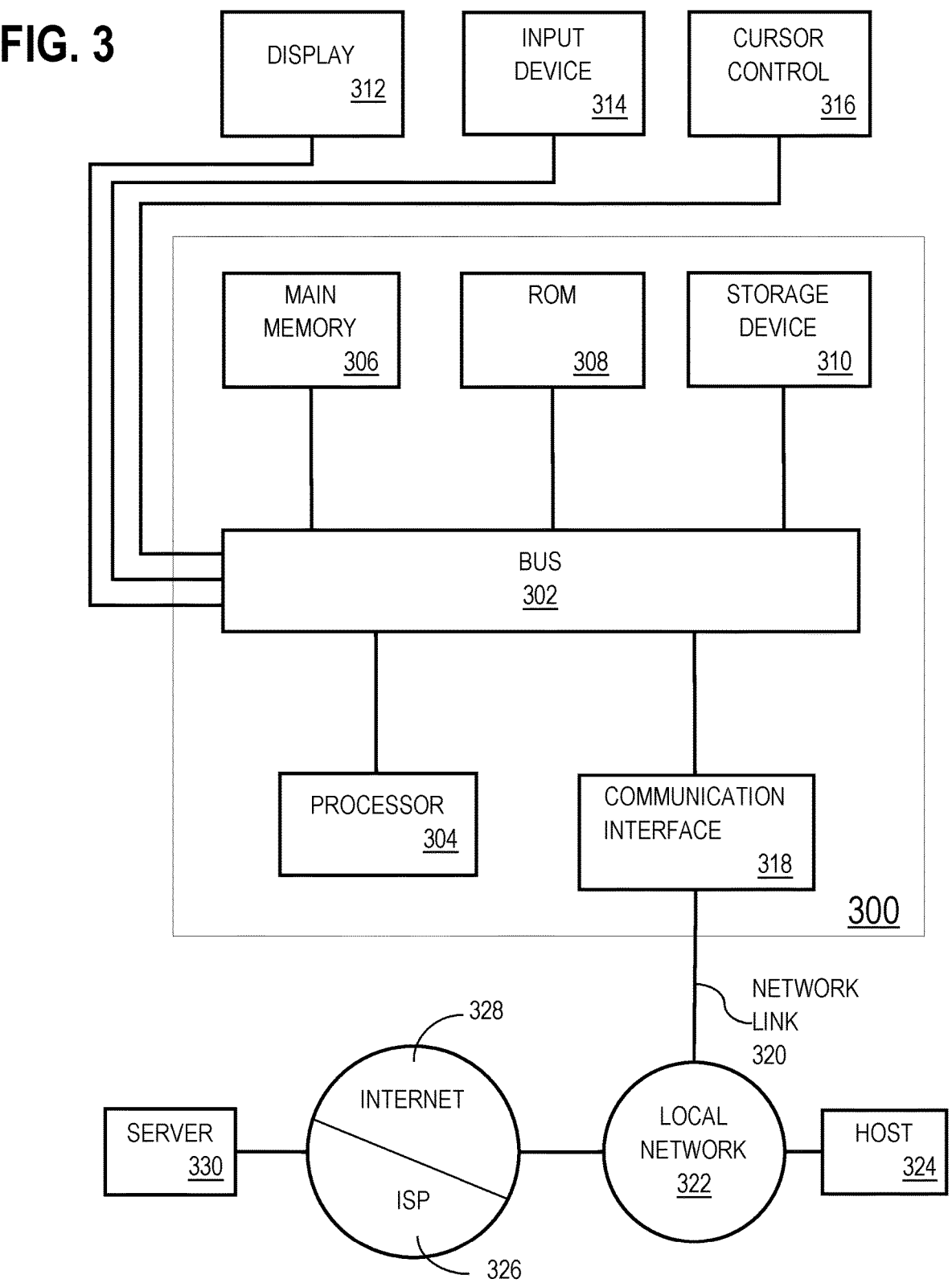
FIG. 3 illustrates a block diagram of a system in accordance with one or more embodiments.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic, or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic, or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer readable media comprising instructions which, when executed, by one or more hardware processors, cause performance of operations comprising:
   receiving a query execution plan associated with a query;
   dividing the received execution plan into one or more components;
   determining, for each component, a predicted performance value associated with executing the component, wherein the performance value associated with executing the component is determined based at least in part on a predicted resource usage associated with executing the particular component, wherein the predicted resource usage is determined based at least in part, on at least one prior execution of at least one other component having similar attributes to the component;

determining, based at least in part on the predicted performance value associated with each component, a predicted performance associated with the query execution plan;

determining a performance threshold for the query based at least in part on the predicted performance associated with the query execution plan, wherein the performance threshold is different than the predicted performance associated with the query execution plan;

executing the query associated with the received query execution plan;

comparing at least one monitored or predicted runtime performance metric associated with executing the query to the performance threshold; and halting execution of the query associated with the query execution plan in response to a determination that the at least one monitored or predicted runtime performance metric associated with executing the query execution plan does not satisfy the performance threshold.

2. The one or more media of claim 1, wherein halting execution of the query associated with the query execution plan comprises:
executing one or more undo commands to rollback a state of one or more tables on which the query has performed operations.

3. The one or more media of claim 2, wherein halting execution of the query associated with the query execution plan comprises:
determining a predicted resource usage associated with completing execution of the query execution plan;
determining a resource usage associated with executing the one or more undo commands;
halting execution of the query associated with the query execution plan in response to determining that the predicted resource usage associated with completing execution of the query execution plan exceeds the resource usage associated with executing the one or more undo commands.

4. The one or more media of claim 1, wherein the performance threshold is further determined based on a capacity of a system executing the received query execution plan.

5. The one or more media of claim 1, wherein the predicted resource usage comprises a predicted processing unit utilization.

6. The one or more media of claim 1, wherein the performance threshold is further determined based on a disk input/output capacity of a system executing the received query execution plan.

7. The one or more media of claim 1, wherein determining, for each component, the predicted resource usages associated with executing the component comprises determining an expected time duration associated with executing the component.

8. The one or more media of claim 1, wherein halting execution of the query associated with the query execution plan comprises undoing at least one change made to a database prior to halting execution of the query execution plan.

9. The one or more media of claim 1, further comprising: training a machine learning model to classify the query based on predicted resource usage metrics; and classifying the query using the machine learning model; wherein halting execution of the query associated with the query execution plan is further based on said classifying the query using the machine learning model.

10. The one or more media of claim 9, further comprising: updating the machine learning model using unsupervised learning.

11. The one or more media of claim 9, wherein the machine learning model is a query estimation model trained to estimate runtime for queries based on a set of query attributes.

12. One or more non-transitory computer readable media comprising instructions which, when executed, by one or more hardware processors, cause performance of operations comprising:
receiving a query execution plan associated with a query;
determining one or more attributes of the received query execution plan, identifying statistics associated with prior executions of queries having similar attributes to the one or more attributes of the query execution plan;
determining, based at least in part on the statistics associated with the prior executions of queries having similar attributes to the one or more attributes of the query execution plan, a predicted time duration associated with the query execution plan;
determining, based at least in part on the predicted time duration associated with the query execution plan, a threshold time duration associated with the query execution plan wherein the threshold time duration is different than the predicted time duration;
executing the query associated with the received query execution plan;
comparing at least one of a current or predicted running time of the query execution plan to the threshold time duration; and
halting execution of the query associated with the query execution plan in response to a determination that at least one of the current or predicted running time of the query execution plan exceeds the threshold time duration.

13. The one or more media of claim 12, wherein halting execution of the query associated with the query execution plan comprises:
executing one or more undo commands to rollback a state of one or more tables on which the query has performed operations.

14. The one or more media of claim 13, wherein halting execution of the query associated with the query execution plan comprises:
determining a predicted resource usage associated with completing execution of the query execution plan;
determining a resource usage associated with executing the one or more undo commands;
halting execution of the query associated with the query execution plan in response to determining that the predicted resource usage associated with completing execution of the query execution plan exceeds the resource usage associated with executing the one or more undo commands.

15. The one or more media of claim 12, wherein the threshold time duration is determined based on an amount of resources available to a system during execution of the query execution plan.

16. The one or more media of claim 12, wherein the threshold time duration is determined based on completion times of the prior executions of the query execution plan.

17. A system comprising:
one or more hardware processors;
one or more non-transitory computer-readable media storing instructions which, when executed, by the one or more hardware processors, cause the system to:
receiving a query execution plan associated with a query;
dividing the received execution plan into one or more components;
determining, for each component, a predicted performance value associated with executing the component, wherein the performance value associated with executing the component is determined based at least in part on a predicted resource usage associated with executing the particular component, wherein the predicted resource usage is determined based at least in part, on at least one prior execution of at least one other component having similar attributes to the component;
determining, based at least in part on the predicted performance value associated with each component, a predicted performance associated with the query execution plan;
determining a performance threshold for the query based at least in part on the predicted performance associated with the query execution plan, wherein the performance threshold is different than the predicted performance associated with the query execution plan;
executing the query associated with the received query execution plan;
comparing at least one monitored or predicted runtime performance metric associated with executing the query to the performance threshold; and
halting execution of the query associated with the query execution plan in response to a determination that the at least one monitored or predicted runtime performance metric associated with executing the query execution plan does not satisfy the performance threshold.

18. The system of claim 17, wherein the performance threshold is further determined based on a capacity of the system when executing the received query execution plan.

19. The system of claim 17, wherein the predicted resource usage comprises a predicted processing unit utilization.

20. A system comprising:
one or more hardware processors;
one or more non-transitory computer-readable media storing instructions which, when executed, by the one or more hardware processors, cause the system to:
receiving a query execution plan associated with a query;
determining one or more attributes of the received query execution plan, identifying statistics associated with prior executions of queries having similar attributes to the one or more attributes of the query execution plan;
determining, based at least in part on the statistics associated with the prior executions of queries having similar attributes to the one or more attributes of the query execution plan, a predicted time duration associated with the query execution plan;
determining, based at least in part on the predicted time duration associated with the query execution plan, a threshold time duration associated with the query execution plan wherein the threshold time duration is different than the predicted time duration;
executing the query associated with the received query execution plan;
comparing at least one of a current or predicted running time of the query execution plan to the threshold time duration; and
halting execution of the query associated with the query execution plan in response to a determination that at least one of the current or predicted running time of the query execution plan exceeds the threshold time duration.

* * * * *